F. MANNING.
PLOW.
APPLICATION FILED AUG. 8, 1918.

1,301,724.

Patented Apr. 22, 1919.

WITNESSES
Frank C. Palmer.
J. L. McAuliffe

INVENTOR
Ferdinand Manning
BY
ATTORNEYS

UNITED STATES PATENT OFFICE.

FERDINAND MANNING, OF GENESEO, KANSAS.

PLOW.

1,301,724. Specification of Letters Patent. Patented Apr. 22, 1919.

Application filed August 8, 1918. Serial No. 248,921.

*To all whom it may concern:*

Be it known that I, FERDINAND MANNING, a citizen of the United States, and a resident of Geneseo, in the county of Rice and State of Kansas, have invented a new and Improved Plow, of which the following is a description.

General objects of my invention are to provide a plow so formed as to effectively shed the turned ground and to provide a revolving clearer so formed and so arranged relatively to the plow as to maintain the latter clear of weeds and trash, the action of the plow and clearer to be such as to cause the trash to be deposited on the surface of the ground and uncovered to form a mulch. The construction and arrangement of the parts whereby the above and other objects are attained will be set forth in the specific description following.

Reference is to be had to the accompanying drawings forming a part of this specification, it being understood that the drawings are merely illustrative of one example of the invention.

Figure 1:
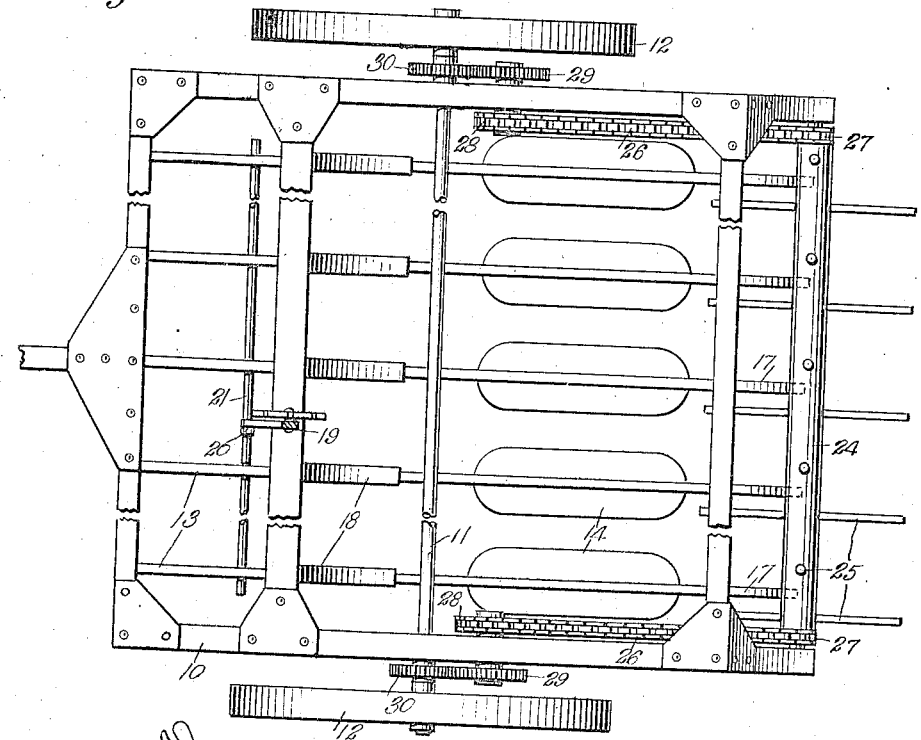
Figure 1 is a plan view of a wheel plow embodying my invention.
Figure 2:
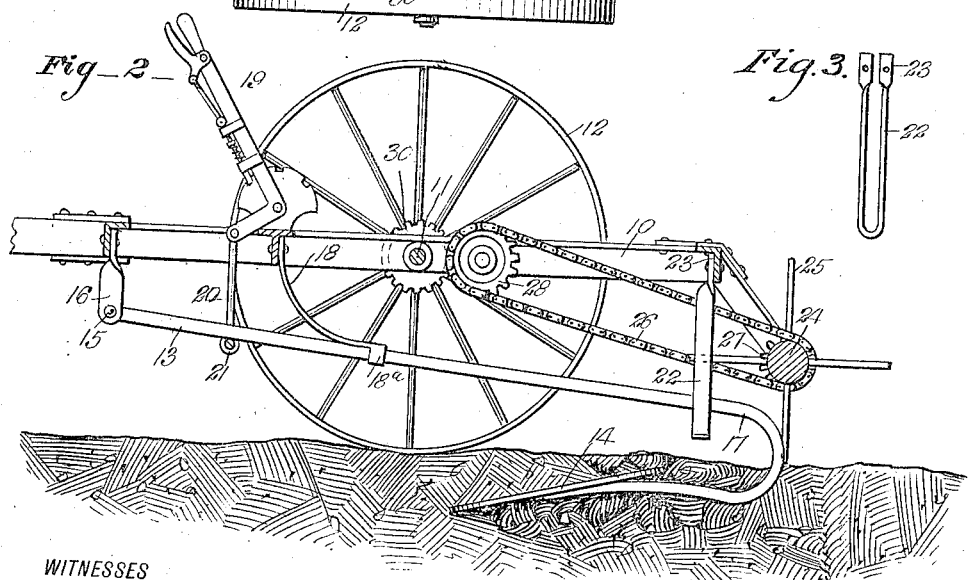
Fig. 2 is a longitudinal vertical section thereof.
Figure 3:
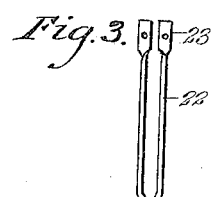
Fig. 3 shows the form of guide employed with plow beams.

In carrying out my invention in practice in accordance with the illustrated example, any suitable frame 10 is provided, having running wheels 12 on a suitable axle 11. Any practical number of plow beams 13, according to the size of the implement, are provided carrying shovels 14 of a character to constitute essentially a shovel plow. The beams are, in the present example, pivoted as at 15 to depending brackets 16 provided on the frame 10. The shovels 14 are in the form of flat, oblong blades with preferably rounded ends and each blade is secured to the forward end of a standard 17, and said standards are in curved or bowed form, that is to say, the standard and beam constitute jointly an elongated bow in the rear of the shovel 14. The plow beams 13 are pressed downwardly to the working position by springs 18 embracing the beams as at 18ª and secured at their upper ends to the frame 10. The plows are raised in any suitable manner as by a hand lever 19 connected by a link 20 with a cross bar 21 extending beneath the several beams. The plows are braced and guided in U-shaped keeper yokes 22 having the upper ends 23 thereof suitably secured to the frame 10.

The shovel it will be observed is at a low angle on the standard and with the flat form of the shovel and the ample clearance space provided in the rear of the shovel and in front of the curve of the standard, the plow readily clears itself of the soil and the trash is accommodated in front of the standard so as to be covered to the minimum extent.

In order to maintain the elongated curved or bowed standard 17 clear of weeds and trash and thus maintain clearance for the dirt passing over the rear ends of the shovels, I provide a revolving clearer which preferably is in the form of a single transverse core 24 revolubly mounted at its ends in the frame 10 and carrying pairs of clearing fingers or tines 25, each pair presenting fingers preferably projecting from the core at diametically opposite points thereon, there being one of such fingers of a pair at each side of a standard 17. The clearer is revolved in a direction to cause the fingers at the under side of the core to move forwardly and thereby turn the trash over the core and deposit it in the rear of the clearer for which purpose any suitable drive means may be provided. In the illustrated example a chain belt 26 runs over sprockets 27 on the core 24 and over sprocket wheels 28 having gear wheels 29 meshing with similar wheels 30 on the axle 11.

By the above described construction the elongated bowed standard coacting with the flat oblong shovel gives the result that the shovel readily clears itself of dirt and the clearer operating at both sides of the bowed standard maintains the latter clear of trash, at the same time acting to deposit the trash on the ground in a manner to constitute a mulsh.

I would state in conclusion that while the illustrated example constitutes a practical embodiment of my invention I do not limit myself strictly to the mechanical details herein illustrated since manifestly the same can be considerably varied without departure from the spirit of the invention as defined in the appended claims.

Having thus described my invention, I claim as new, and desire to secure by Letters Patent:

1. A plow including a shovel, a standard presenting a forwardly extending lower end carrying said shovel and an upwardly extending member behind and distant from the end of the shovel, and a transverse rotary clearer presenting fingers turning in a path at a side of the upwardly extending member of the standard and behind said shovel; together with means to drive said clearer in a direction to cause said fingers to turn forwardly at the under side of the axis of rotation and rearwardly above said axis.

2. In a plow, shovels, standards carrying said shovels and presenting a bowed form in the rear of the shovels, revoluble clearer elements disposed at opposite sides of each standard to turn in paths overlapping the standards, and means to drive said clearer elements in a direction to cause them to turn forwardly at the under side of their axis of rotation and rearwardly above said axis.

FERDINAND MANNING.

Copies of this patent may be obtained for five cents each, by addressing the "Commissioner of Patents, Washington, D. C."